United States Patent [19]
Topping et al.

[11] Patent Number: 5,732,873
[45] Date of Patent: Mar. 31, 1998

[54] MAGNETIC ENERGY MONITOR FOR AN ULTRASONIC WIREBONDER

[75] Inventors: Mark S. Topping, Lincoln Park; Cuong V. Pham, Northville; Brian J. Hayden, Royal Oak, all of Mich.

[73] Assignee: Ford Motor Company, Dearborn, Mich.

[21] Appl. No.: 663,574

[22] Filed: Jun. 13, 1996

[51] Int. Cl.$^6$ ................................................. B23K 20/10
[52] U.S. Cl. ........................... 228/1.1; 228/9; 228/56.5
[58] Field of Search ............................ 228/51.1, 1.1, 228/9, 56.5

[56] References Cited

U.S. PATENT DOCUMENTS

| | | | |
|---|---|---|---|
| 3,153,850 | 10/1964 | Worlton et al. | 228/102 |
| 3,794,236 | 2/1974 | Salzer et al. | 228/1.1 |
| 4,040,885 | 8/1977 | Hight et al. | 228/1.1 |
| 4,341,574 | 7/1982 | Landes | 228/1.1 |
| 5,357,423 | 10/1994 | Weaver et al. | 228/1.1 |
| 5,360,155 | 11/1994 | Ooki et al. | 228/1.1 |

FOREIGN PATENT DOCUMENTS 755477  8/1980  U.S.S.R. ................................ 228/9

OTHER PUBLICATIONS

Kaman "Noncontact Position Measuring System", Ultrasonic System Analyzer UA-7251 Publication 860102-000, Rev. A, 1995.

Primary Examiner—P. Austin Bradley
Assistant Examiner—Jeffrey T. Knapp
Attorney, Agent, or Firm—Kevin G. Mierzwa

[57] ABSTRACT

An ultrasonic wirebonder has a horn and a transducer for vibrating the horn at a predetermined frequency. A magnet affixed to the horn generates a magnetic field. A coil coupled to the magnet has an output signal induced from the magnetic field moving relative to said coil. A filtering means filters the output signal from the coil to determine the reliably of the ultrasonic bond. An output device is used to monitor the output signal and determine whether the bond is reliable.

18 Claims, 3 Drawing Sheets

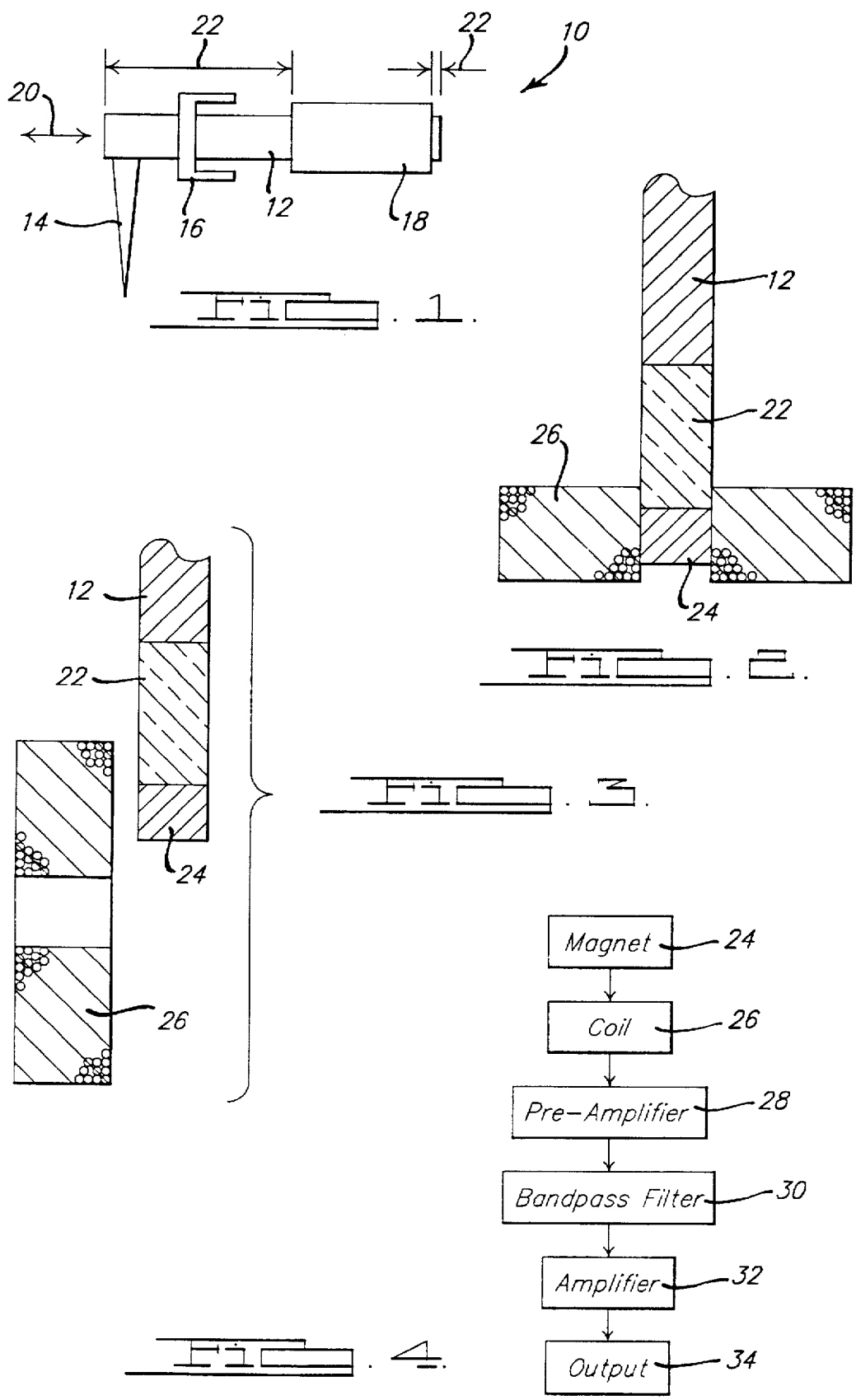

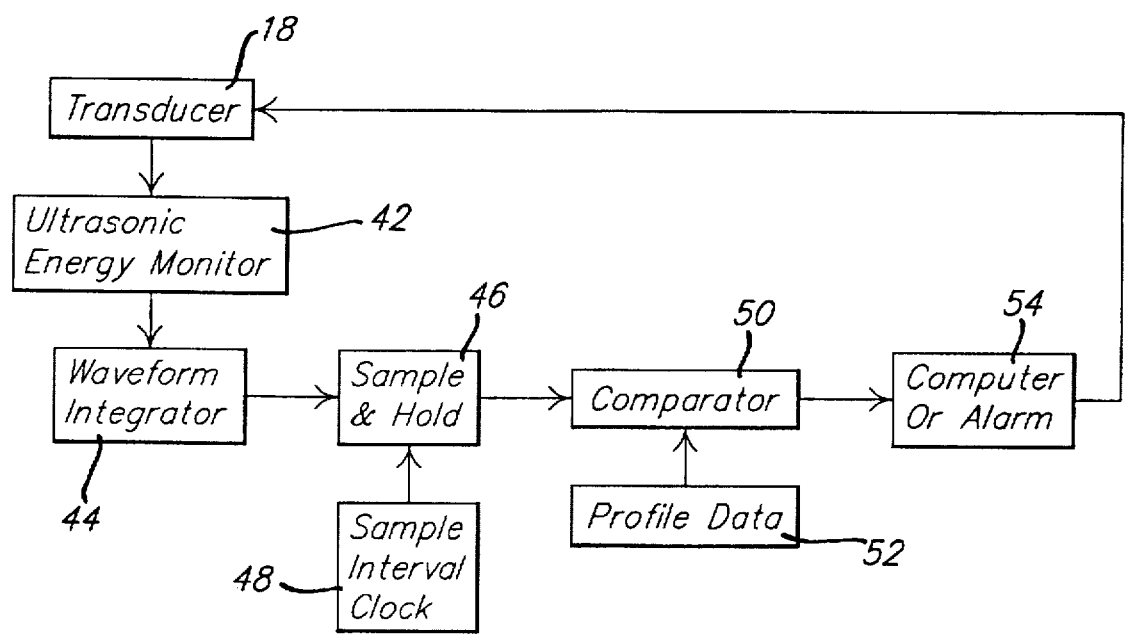
FIG. 7.
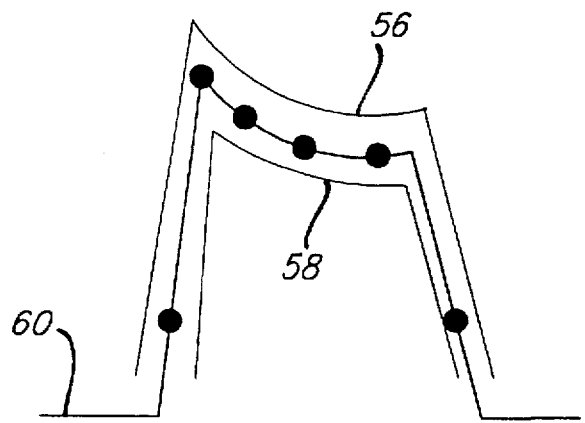
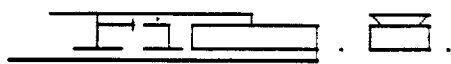
FIG. 8.

MAGNETIC ENERGY MONITOR FOR AN ULTRASONIC WIREBONDER

FIELD OF THE INVENTION

The present invention relates generally to wirebonding electrical components, and more specifically to a method of monitoring the wire bonding process to ensure adequate bonds.

BACKGROUND OF THE INVENTION

In the manufacture of integrated circuits wire bonding is used to connect electrical contacts on semiconductor devices to circuit leads which form an electrical circuit. Wire bonds comprise a wire that is metallurgically bonded to a bond pad on the integrated circuit and the lead.

An ultrasonic bonder has a horn connected to a transducer that vibrates the horn at a predetermined frequency. Energy is transferred through the horn to the wire to bond the wire to a bond pad. It has been found that the amplitude of the vibration at the horn is important in determining whether there has been significant energy transferred to the wire to form a reliable bond. Because the change in amplitude from a reliable bond to an unreliable bond is very small, a highly precise measurement apparatus must be used. Prior art devices do not disclose an apparatus for measuring small changes in the amplitude of the ultrasonic horn, e.g., within the angstrom range.

U.S. Pat. No. 3,794,236 monitors the vibration by using an accelerometer which is mounted to the bonding tool. The accelerometer of the '236 Patent is believed not to provide accurate measurements of the amplitude of the vibration bonding tool in the angstrom range.

U.S. Pat. No. 3,153,850 also recognizes the importance of monitoring the amplitude of the vibrating tool. The means for monitoring the amplitude is a pick up cartridge for a phonograph. The pickup cartridge does not have the requisite resolution for proper monitoring of the vibration.

SUMMARY OF THE INVENTION

The present invention overcomes the disadvantages of the related art by providing a horn and a transducer for vibrating the horn at a predetermined frequency. A magnet affixed to the horn generates a moving magnetic field. A coil located proximate to the magnet has an induced output signal from the moving magnetic field. A filtering means filters the output signal from the coil to determine the reliably of the ultrasonic bond. An output means is used to monitor the output signal and determine whether the bond is reliable.

An advantage of the present invention is that the means for monitoring the tool may be placed around the tool or placed adjacent to the tool. Such a configuration is easily adaptable for monitoring an existing tool.

BRIEF DESCRIPTION OF THE DRAWINGS

These and other objects, advantages, and features of the present invention will be apparent to those skilled in the art upon reading the following description with reference to the accompanying drawings, in which:

FIG. 1 is a ultrasonic horn adaptable to have a monitoring system according to the present invention;

FIG. 2 is a cross-sectional view of the amplitude sensing means;

FIG. 3 is a cross-sectional view of alternative configuration for amplitude sensing means;

FIG. 4 is a block diagram of a ultrasonic monitoring system according to the present invention;

FIG. 7 is a block diagram of a closed loop amplitude monitoring system; and

FIG. 8 is an output wave form shown with the outer limit and inner limits of a reliable bond.

DETAILED DESCRIPTION OF THE PREFERRED EMBODIMENT

Figure 5:
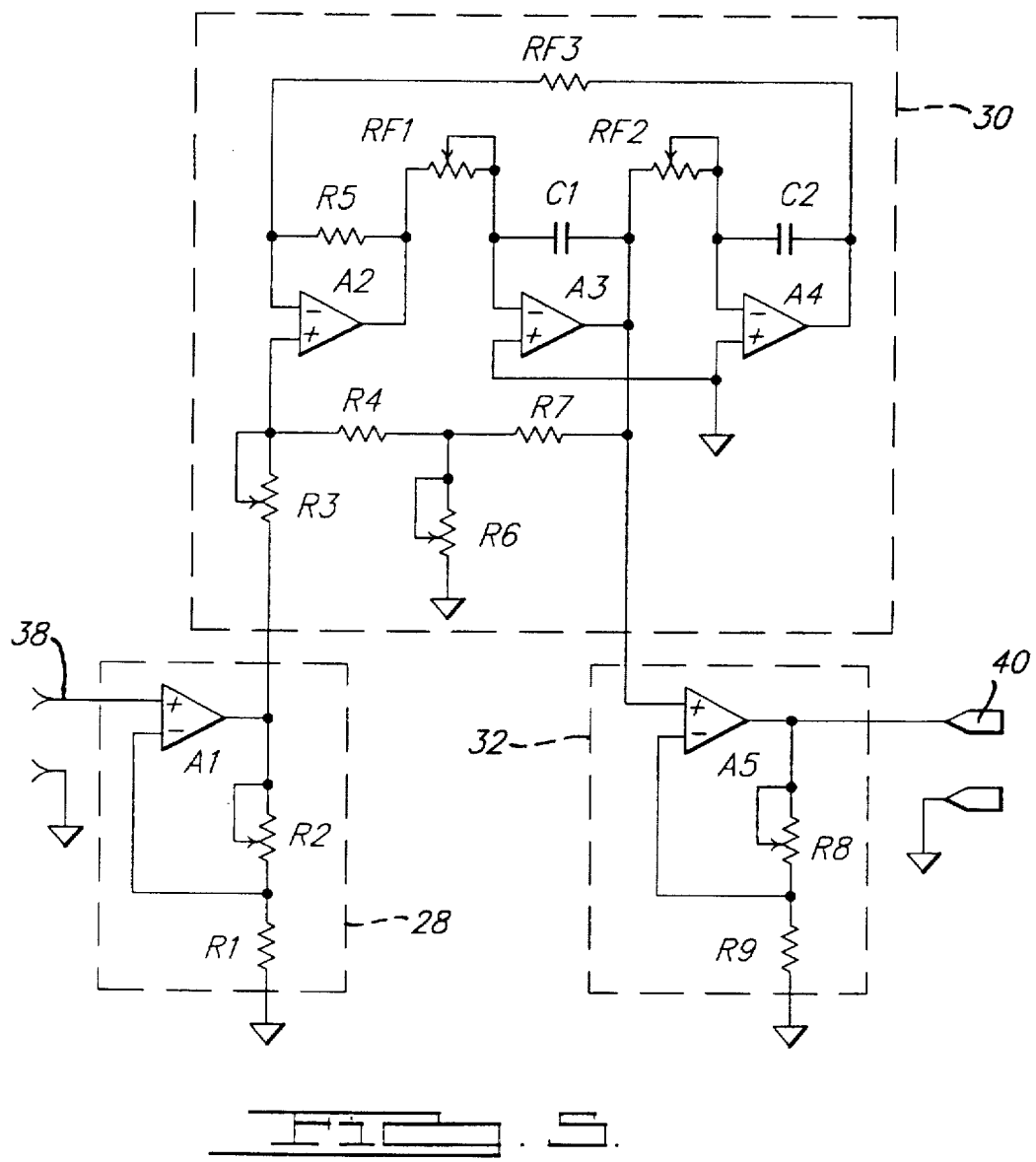
FIG. 5 is a schematic of the circuit of FIG. 4.

Referring to FIG. 1, a wire bonder 10 has a horn 12 which is affixed to a bonding tool 14. A mounting ring 16 is used to hold horn 12 within the wire bonding system (not shown). An ultrasonic transducer 18 is used to vibrate horn 12 that vibrates bonding tool 14. Ultrasonic transducer 18 vibrates bonding head in the direction shown by arrows 20. In the present invention, the frequency of the vibration of horn 12 is about 60 Khz. Frequency ranges in ultrasonic equipment typically span from 15 Khz to 200 Khz. Regions 22 are the areas most suitable for measuring the amplitude of the vibration of the horn. Along the length of 22 are null points in the vibration. The amplitude measurement apparatus is preferably placed at points within regions 22 that resonate with the highest amplitude.

Referring now to FIG. 2, the end of horn 12 is shown having an insulator 22 and a magnet 24. Insulator 22 is preferably a non-metallic insulator. A non-metallic insulator isolates the magnet from directly contacting horn 12. A coil 26 is located around the magnet 24 so that as horn 12 vibrates a current is induced in the coil.

Coil 26 is preferably a coil of highly conductive material such as copper. Enough turns in the wire must be provided to yield sensitivity. If the turns are too high, however, it is believed that losses would occur in the coil that reduce the sensitivity. A coil of forty gauge wire having between 300 and 400 turns was found to give satisfactory results.

Referring now to FIG. 3, magnet 24 is located proximately the same as in FIG. 2 except that coil 26 is located next to magnet 24 rather than around magnet 24. A current is induced by the magnetic field of the vibrating magnet moving through the coil.

Referring now to FIG. 4, magnet 24 induces a current in coil 26. To determine the amplitude of the displacement of the horn, the signal from the coil is first placed through a preamplifier 28 which amplifies the signal. A band pass filter 30 then filters all but a predetermined range of frequencies from the signal. Band pass filter 30 rejects all the noise other than the frequencies at which the horn vibrates to prevent introduction of electromagnetic interference with the signal. Typically, this frequency is 60 kilohertz. Band pass filter 30, for example, may only permit frequencies within a few Khz of the horn vibration frequency to pass through and enter amplifier 32. Amplifier 32 multiplies the amplitudes so that small changes in amplitude may be detected. Output 34 may be several devices such as an oscilloscope or other computing means which could signal an alarm or record the data as to whether a proper wire bond has been formed.

Referring now to FIG. 5, preamplifier 28, band pass filer 30 and amplifier 32 are shown in more detail. The operation amplifier A1–A5 are preferably the same model. For example, each opamp may be an LF351. Amplifier A1, resistor R1 and adjustable resistor R2 form an amplifier to amplify the input signal from input 38. In this case R1 is 10K ohms and the adjustable resistor is adjustable around 100K ohms. Adjustable resistor R3 and R4 adjust the gain. In this case R3 is adjustable and about 1 Megaohms and R4 is about 100K ohms. Amplifiers A2, A3, and A4 select the frequency range for the pass frequencies of band pass filter 30. In this case a frequency range of 60–200 kilohertz is desired. Adjustable resistors Rf1 and Rf2 and capacitor C1 and C2 set the center frequency of the filter. Adjustable resistor Rf1 and Rf2 are preferably 10K ohms. Capacitors C1 and C2 are preferably 820 picofarads. Resistor R5 is preferably 100K ohms. Resistors R6 and R7 are used to adjust the Q i.e., the width of the pass frequencies of the circuit. Resistor R6 and R7 are preferably 100K with R6 being adjustable.

Amplifier A5 is used in conjunction with adjustable resistors R8 and resistor R9 as amplifier 32 to amplify the output of the band pass filter. Output 40 may be analyzed to distinguish changes in the amplitude of the resonating horn. These values, of course, may be easily adjusted by one skilled in the art if the frequency of the horn is different.

Figure 6:
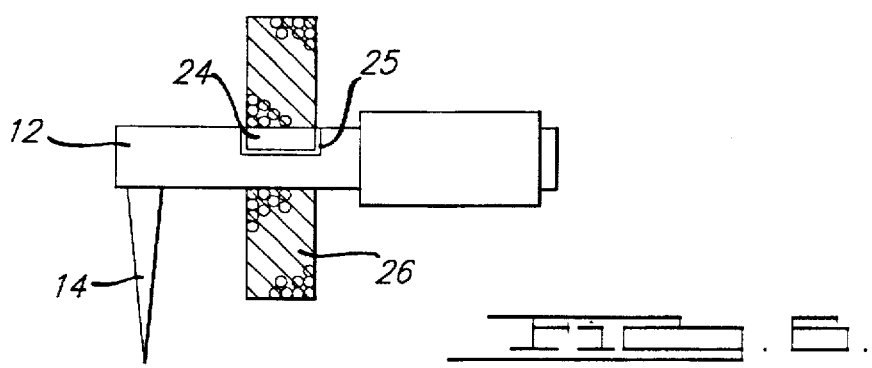
FIG. 6 is a side view of an ultrasonic horn showing the placement of an amplitude sensing means.

Referring now to FIG. 6, an alternative location for magnet 24 is shown closer to bonding tool 14. In this configuration coil 26 is located around the horn 12. Coil 26 may also be placed adjacent to horn 12 similar to that of FIG. 3. In this configuration magnet 24 is also isolated from the horn 12 by insulator 22.

Referring now to FIG. 7, a closed loop system is shown. An ultrasonic energy monitor 42 such as that of FIG. 5 process the wave form from horn 12. By using a wave form integrator 44 the amount of energy used to form each bond may be monitored. Energy in a bond may take the form of time of bonding, actual power to the transducer and force applied to the wire. Wave form integrator 44 may perform a simple numerical integration of the wave form over a predetermined time. The predetermined time is determined by sample and hold circuit 46 that is connected to a sample interval clock 48 block. Sample and hold circuit 46 is used to provide a predetermined number, for example, over the time it takes to form a bond. A comparator 50 compares profile data 52 with the present bond. Profile data 52 is predetermined data that determines whether the bond will be reliable. Profile data is typically in the form of an amount of energy used to form the bond. A computer 54 receives the comparison of the profile data to the present ultrasonic bond and determines whether the current ultrasonic bond is within the limits for a reliable bond. If the limit is outside of a reliable bond the circuit board may be rejected and the machine operator flagged by an alarm. Also, a bar code may be placed on the circuit board. Since several bonds are typically made, these bonds may then be reworked by hand. Computer 54 may provide feedback to transducer 18 to provide either more or less energy depending on the comparison made in comparator 50. Typically, power applied to the transducer is a practical method of changing the energy to the transducer. The adjustment keeps the system providing reliable bonds.

Referring now to FIG. 8, the sample of profile data 52 is shown. Profile data may take the form of an outer limit 56 and an inner limit 58. If the current energy level 60 is between outer limit 56 and inner limit 58 the bond is a proper bond.

As would be evident to one skilled in the art, several modifications of the invention may be made while still being within the scope of the appended claims. For example, an implementation may include affixing the coil on the horn rather than adjacent the horn while placing the magnet adjacent to the coil.

We claim:

1. An ultrasonic wire bonder comprising:

a horn for forming a bond;

a transducer vibrating said horn at a predetermined frequency;

a magnet affixed to said horn generating a magnetic field, said magnet moving with said horn;

a coil coupled to said magnet inducing an output signal in said coil from said magnetic field moving relative to said coil;

a band pass filter connected to said coil receiving said output signal and filter noise from said output signal;

output means receiving said output signal for monitoring a quality of a bond.

2. An ultrasonic wire bonder as recited in claim 1 wherein said coil has an axis, said axis oriented parallel to said horn.

3. An ultrasonic wire bonder as recited in claim 1 wherein said coil has an axis, said axis oriented perpendicular to said horn.

4. An ultrasonic wire bonder as recited in claim 1 wherein said predetermined frequency of said transducer is 60 KHz, and said band pass filter has a pass band between 60 KHz and 200 KHz.

5. An ultrasonic wire bonder as recited in claim 1 further comprising a preamplifier connector between said coil and said band pass filter for amplifying said output signal.

6. An ultrasonic wire bonder as recited in claim 1 further comprising an output amplifier connected between said band pass filter and said output means for amplifying said output signal.

7. An ultrasonic wire bonder as recited in claim 1 wherein said output signal is indicative of energy supplied to said bond.

8. An ultrasonic wire bonder comprising:

a horn for forming a bond;

a transducer vibrating said horn at a predetermined frequency;

a magnet affixed to said horn generating a magnetic field, said magnet moving with said horn;

a coil coupled to said magnet inducing an output signal in said coil from said magnetic field moving relative to said coil;

sampling means coupled to said magnet for sampling said output signal at predetermined intervals;

a memory storing a profile of a proper bond;

comparison means for comparing said output signal to said profile of a proper bond;

output means for signaling if said output signal represents of a profile of said proper bond.

9. An ultrasonic wire bonder as recited in claim 8 wherein said coil has an axis, said axis oriented parallel to said horn.

10. An ultrasonic wire bonder as recited in claim 8 wherein said coil has an axis, said axis oriented perpendicular to said horn.

11. An ultrasonic wire bonder as recited in claim 8 wherein said predetermined frequency of said transducer is 60 KHz; and said band pass filter has a pass band between 60 KHz and 200 KHz.

12. An ultrasonic wire bonder as recited in claim 8 further comprising a preamplifier connector between said coil an said band pass filter for amplifying said output signal.

13. An ultrasonic wire bonder as recited in claim 8 further comprising an output amplifier connected between said band pass filter and said output means for amplifying said output signal.

14. An ultrasonic wire bonder as recited in claim 8 further comprising a band pass filter connected between said coil and said sampling means receiving said output signal.

15. An ultrasonic wire bonder as recited in claim 8 further comprising feedback means connected to said output means and for adjusting an energy of said transducer if said transducer is beyond said predetermined limits.

16. An ultrasonic wire bonder as recited in claim 15 wherein adjusting said energy comprises adjusting a power supplied to said transducer.

17. An ultrasonic wire bonder as recited in claim 15 wherein adjusting said energy comprises adjusting a time for forming said bond.

18. An ultrasonic wire bonder as recited in claim 16 wherein said output means receiving said output signal for monitoring a quality of a bond.

* * * * *